Jan. 20, 1970  L. M. HOURLIER  3,490,536
PLASTIC HORSESHOE
Filed Dec. 3, 1968

Léon Maurice Hourlier
Inventor by  Karl G. Ross
Attorney

United States Patent Office 3,490,536
Patented Jan. 20, 1970

3,490,536
PLASTIC HORSESHOE
Léon Maurice Hourlier, 28 Avenue Jacqueminot,
Meudon, Haut-de-Seine, France
Filed Dec. 3, 1968, Ser. No. 780,837
Claims priority, application France, Mar. 26, 1968,
145,436
Int. Cl. A01l 5/00
U.S. Cl. 168—4                                6 Claims

ABSTRACT OF THE DISCLOSURE

The present invention relates to a plastic horseshoe having a fluid impervious upper plate joined to a high abrasive resistant lower plate.

BACKGROUND OF THE INVENTION

Figure 1:
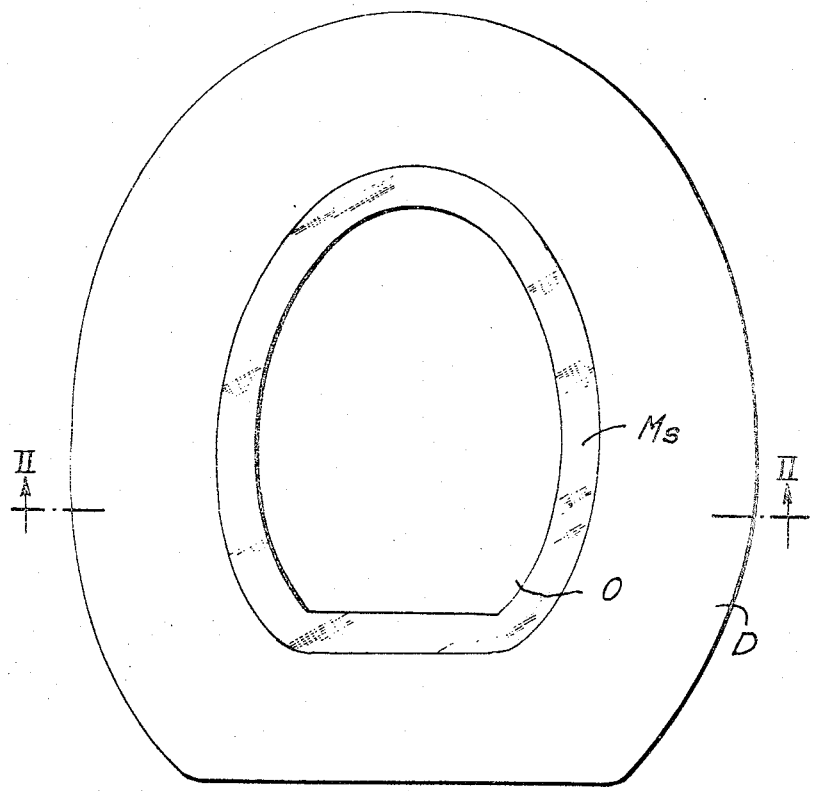

It is now widely known that plastic horseshoes have a number of advantageous features in comparison with conventional iron horseshoes, notably a greater flexibility, the damping of shocks with the ground surface, the attenuation of the consequences of these shocks.

However, in actual practice it was observed that this greater flexibility was objectionable for various reasons. Thus, more particularly, when a hoof provided with a plastic horseshoe strikes the ground, it is liable to hit various objects and notably stones, large-size gravel, etc., and the resulting shock may be strong enough to cause relatively important distortion of the plastic shoe, likely to produce scaling in the wall of the horse's hoof, especially in the case of horses having a relatively brittle hoof rind.

Besides, it is also known that the plastic materials having a relatively high abrasion resistance (notably polyurethane) which are commonly used in the manufacture of these plastic horseshoes are particularly hygroscopic. I observed that a permanent contact between plastic horse shoes impregnated notably with liquid manure and the hoof sole (and notably the frog) is attended by a softening and subsequent deterioration of the rind.

It is the essential object of the present invention to provide improved plastic horseshoes capable of eliminating the two inconveniences set forth hereinabove.

SUMMARY OF THE INVENTION

The plastic horseshoe according to this invention consists of a pair of synthetic plastic plates assembled with each other and consisting the one of a plastic material having a relatively high resistance to abrasion (for example polyurethane) and the other of the hard, impervious plastic material.

A layer or sheet of elastic material (such as natural or synthetic material, or the like) may be sandwiched between the two plates mentioned in the preceding paragraph.

According to a specific feature characterising this invention the plates are assembled along the marginal portions of the inner aperture.

Advantageously, these plates are independent of each other in their outer portions and assembled at these portions only by the shoeing or fixing nails.

According to this specific form of embodiment of the invention the two plates are assembled along their inner marginal portions by up setting by molding the upper plate on the lower plate by means of a molded bead extending from the lower plate of consisting harder, abrasion-resistant material.

Consequently, it is a specific feature of this invention that the width of the inner aperture of the hard plate is somewhat greater than that of the completed horseshoe so that the setting material extends throughout the height or thickness of the horseshoe in this inner area.

According to a particular form of embodiment of the invention the hard plate has a small flange formed along the edge of its inner aperture so that the setting material will level this flange and thus provide a kind of tongue groove assembly.

Of course, the two plates may be assembled in any other similar fashion.

According to a modified form of embodiment the hard plate may have a plurality of countersunk holes formed therethrough and adapted to be filled with the setting material during the injection molding operation.

According to a further modification the two plates are riveted to each other in this inner area.

Figure 2:
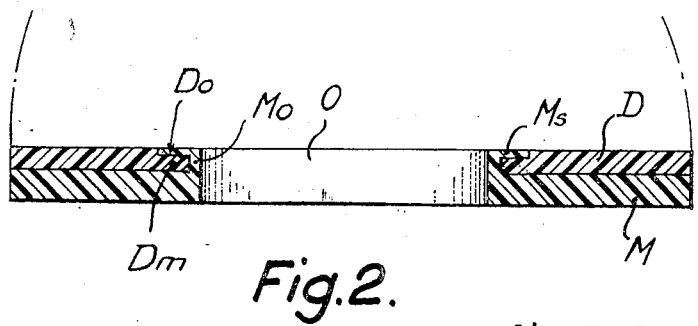

Other features and advantages of the invention will appear as the following description proceeds with reference to the accompanying drawing illustrating diagrammatically by way of example a typical form of embodiment of the invention. In the drawing:

FIGURE 1 is a plane view from above a plastic horseshoe according to this invention, and FIGURE 2 is a cross section taken along the line II—II of FIGURE 1.

As shown in the drawing, this plastic horseshoe constituting the subject-matter of this invention consists of a pair of superposed plates i.e. an upper plate D of hard plastic material and a lower plate M of softer but hard-wearing or abrasion-resistant plastic material, the upper plate D being adapted to be disposed against the hoof rind and the ground-engaging or wearing plate M.

The width of the lateral "strip" constituting the upper plate D is smaller than that of the corresponding strip of plate M, the difference appearing on the inner side, along the edge of the aperture O.

The inner marginal portion of the lateral strip of plate D is provided with a thin recessed portion Do reducing accordingly its thickness from the top face.

The upper plate D, is disposed on the mold bottom prior to the injection of the material which is to constitute the other plate M; the position of plate D being such that the recessed portion Do leaves a narrow passage all around the aperture O. When the wearing material which is to constitute the softer plate M is injected into the mold it fills completely the cavity thereof, with due consideration for the presence of plate D. Therefore, this material will fill up the space left by the recessed portion Do and will thus form a marginal lip Ms which covers this recessed portion and is connected to the plate M by means of a small collar-like portion Mo.

It will be readily understood that the two plates D and M are securely assembled by this "upset" portion Mo–Ms surrounding the thin flange Dm of plate D, even if said plates are made of materials without any inherent adhesive capacity, as it actually occurs when using low-pressure polyethylene for plate D and polyurethane for plate M.

When the horseshoe is positioned on the hoof sole, the two plates D and M are safely assembled on the one hand by the inner "upsetting" Ms, Dm, Mo and M, and on the other hand by the shoeing nails, the hard plate D being adjacent to the hoof sole.

Now, by hypothesis this plate D consists of a material not only hard (i.e. relatively rigid), but also impervious. As a consequence, the liquid manure cannot seep up to the hoof rind or to the frog, as far as the portions thereof which contact the plate D are concerned. Therefore, any risk of inflammation of the rind or frog is precluded.

This hard plate D further counteracts any tendency of its companions plate M to undergo local distortions, for example, when hitting or crushing a stone, and acts at the same time as a load distributor.

Therefore, this hard plate D has a threefold purpose.

Of course, a satisfactory result may also be obtained by using a light alloy (e.g. aluminum) having a density only slightly greater than that of plastic material, for making the hard plate D; however, this metal plate will constitute a restraining means like any other horseshoe, thus eliminating the advantageous "liberty" feature characterising plastic horseshoes.

Of course, it would not constitute a departure from the basic principle of the present invention to bring various modifications thereto, notably by assembling the plates in the inner portions thereof by injecting plastic material through countersunk holes formed in the hard plate, or using rivets or like fastening means.

What I claim as new is:

1. A plastic horseshoe consisting of a pair of ring like plates defining apertures and composed of synthetic resin material which are joined face to face to each other, one plate constituting a ground engaging member and consisting of a plastic material having a relatively high resistance to abrasion, such as polyurethane, and the other a hoof engaging plate comprising a hard and fluid impervious plastic material.

2. Horseshoe as set forth in claim 1, wherein said plates are assembled along the marginal portions of their inner aperture.

3. Horseshoe as set forth in claim 2, wherein said two plates are joined along their inner aperture defining edges by causing one portion of said abrasion-resistant plate to be molded over said hard plates.

4. Horseshoe as set forth in claim 2, wherein the width of the inner aperture of said hard plate is greater than that of the completed horseshoe so that the "upsetting" material extends throughout the horseshoe thickness at said inner portion.

5. Horseshoe as set forth in claim 2, wherein said hard plate includes a small flange along the edge of the inner aperture so that the "upsetting" material from said abrasion-resistant material of the said one plate will also level said flange and provide a kind of tongue-and-groove assembly.

6. Horseshoe as set forth in claim 2, wherein a layer of elastic material such as natural or synthetic rubber is interposed between said two plates.

References Cited

UNITED STATES PATENTS

| | | | |
|---|---|---|---|
| 717,614 | 1/1903 | Peacock | 168—4 |
| 2,705,536 | 4/1955 | Phreaner | 168—14 |

OTHER REFERENCES

Hoofbeats, "Plastic Horseshoes," November 1967, pp. 13–15 and 67.

ALDRICH, F. MEDBERY, Primary Examiner

U.S. Cl. X.R.

168—12